United States Patent [19]
Maier et al.

[11] Patent Number: 4,856,173
[45] Date of Patent: Aug. 15, 1989

[54] METHOD OF THE FORMATION OF SLIDE SURFACES ON A TRACK FOR ELECTROMAGNETICALLY LEVITATED VEHICLES

[75] Inventors: Lorenz Maier, Otterfing; Wilhelm Büchler, Haar; Harald Neumann, Hamburg; Karl H. Lönnecke, Bremen, all of Fed. Rep. of Germany

[73] Assignee: Dyckerhoff & Widmann Aktiengesellschaft, Fed. Rep. of Germany

[21] Appl. No.: 159,961

[22] Filed: Feb. 24, 1988

[30] Foreign Application Priority Data

Feb. 24, 1987 [DE] Fed. Rep. of Germany ....... 3705773

[51] Int. Cl.[4] ............................................. B23P 15/20
[52] U.S. Cl. ................... 29/445; 29/149.5 R; 104/2; 104/118; 264/162; 264/228
[58] Field of Search ............... 29/445, 149.5 R, 168; 104/2, 118; 264/228, 229, 162

[56] References Cited

U.S. PATENT DOCUMENTS

| | | | |
|---|---|---|---|
| 3,368,016 | 2/1968 | Birguer | 264/228 |
| 3,577,626 | 5/1971 | Link | 29/445 |
| 3,974,247 | 8/1976 | Tardieu | 264/228 X |
| 4,093,690 | 6/1978 | Murray | 264/162 X |
| 4,102,957 | 7/1978 | Da Re | 264/228 X |
| 4,123,485 | 10/1978 | Tang | 264/228 X |
| 4,273,740 | 6/1981 | Marchesi et al. | 264/228 |
| 4,512,560 | 4/1985 | Mölzer et al. | 269/20 |
| 4,643,100 | 2/1987 | Valditerra | 104/2 |

FOREIGN PATENT DOCUMENTS

3139636 4/1983 Fed. Rep. of Germany ........ 269/20

Primary Examiner—Timothy V. Eley
Assistant Examiner—Peter D. B. Vo
Attorney, Agent, or Firm—Toren, McGeady & Associates

[57] ABSTRACT

In the formation of finished slide surfaces for slide rails on a track for an electromagnetically levitated vehicle, the track is constructed as a girder-like beam with the slide rails located on cantilevered parts of the upper surface of the beam. The beam can be formed of prestressed concrete. Initially the slide rails are provided with a height oversize. The height oversize part of the slide rails is removed and the slide surface of the rails are finished to the desired degree. The height oversize part is removed by cutting and grinding devices mounted on a machine frame movable over the upper surface of the track. The machine frame is adjustable in the vertical direction from a datum plane formed by the lower surfaces of support stators secured to the undersides of the cantilevered parts of the track. The machine frame rides on the upper surface of the beam and is in contact with the lower surfaces of the support stators.

10 Claims, 10 Drawing Sheets

METHOD OF THE FORMATION OF SLIDE SURFACES ON A TRACK FOR ELECTROMAGNETICALLY LEVITATED VEHICLES

BACKGROUND OF THE INVENTION

The present invention is directed to a method of accurately positioning slide surfaces on slide rails or strips on the upper surface of a track for electromagnetically levitated vehicles. The track is formed as a girder-like beam constructed of steel, reinforced concrete or prestressed concrete. Operating surfaces for the levitated vehicle are formed by lower surfaces of support stators located on the underside of cantilevered parts of the track. The levitated vehicle contacts the support stators. The invention is also directed to the apparatus for carrying out the method and to a facility for housing the apparatus while the method is being performed.

A known track for a high speed railway using electromagnetically levitated vehicles is formed of track supports designed as single-span beams constructed of prestressed concrete and mounted on elevated pillars. The operational elements for electromagnetic levitation technology are located on the track supports and the elements have surfaces required for the support, guidance, driving and braking of the vehicle as well as for data transmission to a control center and for current supply into the vehicles, note the German "Civil Engineer", 1983, pages 129 to 134. This known track has track supports with a closed, approximately, trapezoidally-shaped cross-section with an upper cover plate, or support surface, cantilevered at both sides outwardly from longitudinal support webs. Operational elements for the levitated vehicle are located in the region of the cantilevered parts, such as support stators made of electro-plates and cable windings fixed beneath the cantilevered parts, rails for side guidance of the vehicles and for transmitting braking forces fixed on the sides of the cantilevered parts with slide surfaces or ways located on the upper surface of the track support above the support stators. The levitated vehicles rest on the slide surfaces during stoppages and during any possible malfunction of the electromagnetic system.

The operational elements or members have operational surfaces which must be positioned with great accuracy, because of the high speeds of the levitated vehicles. In the case of track supports constructed of reinforced or prestressed concrete, the fabrication tolerances usually occurring in concrete construction are compensated or bypassed.

There is a known device for avoiding the individual installation and adjustment of operating elements which is very time and effort consuming and which provides the installation and adjustment of the element in a single work step, note DE-OS 31 39 636. The essential feature of this device which include different machining or processing devices located on a single machine frame is that the machine frame which travels on the track support or support beam can be fixed to the track carrier for the individual machining steps and the machining devices are adjusted with reference to external checkpoints by way of surveying equipment for providing accurately positioned attachment of the system parts. Due to the tolerance of the support beam formed of concrete which are unavoidable and because of tolerances in the surveying equipment which cannot be completely eliminated, even when the greatest care is taken, the known method has resulted in shortcomings and inaccuracies.

SUMMARY OF THE INVENTION

Therefore, it is the primary object of the present invention to provide for the construction of operational surfaces on a track for electromagnetically levitated vehicles permitting the adjustment of the operating surfaces required for the levitation technology relative to one another, that is, the slide surfaces on the upper surface of the track and the lower sides of the support stators on the underside of cantilevered parts of the track, with extreme accuracy independent of the design of the track support or beam and independent of external checkpoints utilized in surveying technology.

The present invention includes a method in which, after the attachment and adjustment of support stators, the slide surfaces can be placed in the desired position and condition by a removal operation in which a height oversize part of the slide rails is removed with the underside or lower surface of the support stators serving as a reference or datum plane for the guidance of the machining or cutting devices.

The present invention is based on the concept that the required close tolerances for the track cannot be attained by adjusting the individual operating elements independently of one another with respect to the track support structure. Rather, the present invention is grounded on the concept, especially for track support beams constructed from concrete, that different formation of the operating surfaces is required. While the lower surfaces of the support stators essential for the operation of the levitated vehicles is formed on the support stators, in addition to other operational elements to be attached to the concrete beam, including side guide rails, slide surfaces must be provided on the upper surface of the track support beams formed by machining the beam surface.

In accordance with the present invention, initially the operating elements are secured to the track and are arranged to follow the track gradient and, subsequently, the slide surfaces are formed. As a result, it is possible to align and position the devices for forming the slide surfaces with respect to the existing lower surfaces of the support stators acting as reference planes. Thus, in a particularly simple manner, the required operational dimensions are attained, that is the distance between the lower surfaces of the support stators and the slide surfaces while observing the required low tolerances.

If side guidance rails are positioned along the sides of the cantilevered parts of the track for affording additional operational surfaces for the levitated vehicles, then it is appropriate to form the slide surfaces only after the attachment and adjustment of the side guidance rails.

Where girder-like beams constructed of reinforced- or pre-stressed concrete are used for the tracks with slide rails formed integrally on the upper surfaces of such beams, the following steps are carried out in accordance with the present invention:

A cut is made in each slide rail parallel to the lower surface of the support stators for providing a rough adjustment of the desired height or elevation of the slide surfaces including a plus tolerance, grinding the cut surface of the slide rail formed in the cutting operation for the final adjustment of the height of the slide surface, polishing the ground surface of the slide surfaces to produce a required degree of roughness.

After completing the slide surfaces, laterally extending slots for water removal from the surface of the track beam can be formed in the slide rail by a milling operation. The laterally extending ends of the track beams and of the slots are rounded off by milling with a profile cutter.

In accordance with the present invention, the method is carried out by a machine frame supported on the track support beam so that it is movable and adjustable in height. For carrying out the cutting or machining of the slide rails, the required devices are mounted on the machine frame and contact the beam along the sides downwardly to a location below the support stators. Further, the machine frame is arranged to contact the lower surface of the support stators with such surfaces acting as reference or datum planes for a lifting movement with respect to the surface of the track beam for setting a reference plane for the working devices.

The machine frame is preferably formed as a truss-like structure made up of longitudinal girders, transverse girders, vertical supports and stiffeners, and is equipped with rolling means such as track wheels supported by piston-cylinder units, wherein the support afforded by the rolling means as well as by the lower surfaces of the support stators is located in the region of the truss-like frame positioned along the longitudinal extending side of the track support beam.

Preferably, the rolling means is formed of sets of wheels, with the wheels guided on the slide rails. The wheels of one set can be supported as a rocker straddled by a cross-tie, and positioned at the ends of the piston-cylinder units which support the machine frame.

Probing devices are positioned in the lower region of the truss-like side walls of the machine frame and are arranged to contact the lower surfaces of the support stators. Force measuring devices can be located at the proving devices for regulating the contact pressure against the lower surfaces of the support stators.

The probing device, in a preferred form, can be rolling members affording longitudinal movement along the lower surfaces of the support stators while maintaining the frictional lock afforded by the piston-cylinder units which support the machine frame. These rolling means can be belt or crawler rolling means with a belt or crawler track moving around guidance rollers with the track moving over the lower surface of the support stators. Each rolling means is preferably formed of two individual roller means supported as a rocker, and a load-sensing bolt as a force measuring device can be provided as the bearing bolt of the rocker.

The rolling device supported on the upper surface of the track support beam and the rolling means contacting the lower surface of the support stators are arranged in cross-sectional plane of the machine frame located as closely adjacent to one another as is possible.

Side guidance rollers for contacting the side guidance rails of the track support beam can be provided at the truss-like walls of the machine frame for affording side guidance of the frame. Preferably, the side guidance rollers are arranged in pairs in contact with the side guidance rails.

The following devices for working on the slide rails are positioned on the machine frame in vertical planes relative to the slide rails and in sequence required for carrying out the working steps on the slide rails.

Cutting device for cutting through the slide rail in a plane parallel to the lower surface of the support stators.

Grinding device for grinding the surface of the guide rails cut by the cutting device.

Polishing or finishing device for finishing the slide way surfaces of the slide rail to the desired degree.

A device for breaking up the upper part cut from the slide rails can be located downstream from the cutting device and another device for forming laterally extending slots in the slide strips can be positioned downstream of the finishing device. A device for producing the laterally extending slots can also include means for rounding off the laterally extending edges of the slide rail at the ends of the track support means and at the slots.

The machine frame is formed of an independently displaceable base frame upon which the grinding and finishing devices and possibly a milling device are arranged and of a front attachment frame detachably connected to the base frame on which the cutting device and possible a breaking-up device are arranged. The front attachment frame is supported at its rear end upon the front end of the base frame. A control unit for the working operations, as well as for supplying power to the working devices and disposing of the waste, can be provided at the rear end of the machine frame. Such a unit is preferably supported as a trailer with its front end at the rear end of the base frame.

All of the devices for working on the slide rail are supported on the machine frame so that they are variable in height and adjustable.

The cutting device includes two cutting units, each with a separate cutting disk and a vertical drive shaft for each slide rail, for engagement with the slide rail from opposite sides with the cutter disks offset in the direction of movement of the machine frame relative to one another. The cutting units on the machine frame can be arranged to be swivelled out sideways.

Preferably, the device for breaking or dividing the cut-off portions of the slide rails is supported for longitudinally displacement on the machine frame and is connected with the machine frame by an actuating member, such as a piston-cylinder unit, to include at least a pair of clamping cylinders acting laterally upon a slide rail and a crushing or breaking cylinder also acting laterally against the slide rail.

A flat spacer can be located in the region of the breaking device in the gap cut in the slide rail and having a thickness corresponding approximately to the thickness of the cutter disks. A separation plate can be provided as the spacer which extends into a chute for the lateral disposal of the broken parts of the slide rail.

The machine frame is arranged to be self-propelled and can be driven at a speed corresponding to the working operation of the various devices mounted on the frame. It is appropriate to provide at least one drive unit for each rolling means on the machine frame.

With the apparatus of the present invention, it is not only possible to form the slide rail on new track support beams made of reinforced or prestressed concrete, however, slide rails on track support beams forming a part of a track already in use can be reworked if surface irregularities are developed in the course of time and operation. The same is true for slide surfaces formed as steel parts, if such surfaces are part of steel track supports, or are embedded into concrete beams as operating elements.

If new track support beams are constructed based on the present inventive method and with the apparatus of the present invention, the working operations can be carried out in a fixed installation or facility, for instance within a mill building including means for transporting and supporting a track support beam and with additional supports aligned upstream and downstream of the track support beam for forming a continuation of the rolling and reference planes of the machine frame. The auxiliary supports include a support structure for the machine frame in a stationary state and another support structure for receiving at least the parts of the machine frame which includes the working devices after a working operation on the slide rails has been completed.

The auxiliary support structures must be supported for adjustment in the longitudinal and transverse directions. A finished track support beam can be used as an auxiliary support structure. The support structure for supporting the machine frame in a stationary position prior to carrying out the working operation can be in displaced or horizontal direction relative to the position of the track support beam and the other support structure is also displaceable in the horizontal direction relative to the track support beam so that the support structures can be adapted to different lengths of the track support beams.

The installation or facility in which the working operation can be carried out can be supplemented by a gantry crane for transporting the track support beam with the gantry crane arranged to span the length of the track support beam.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
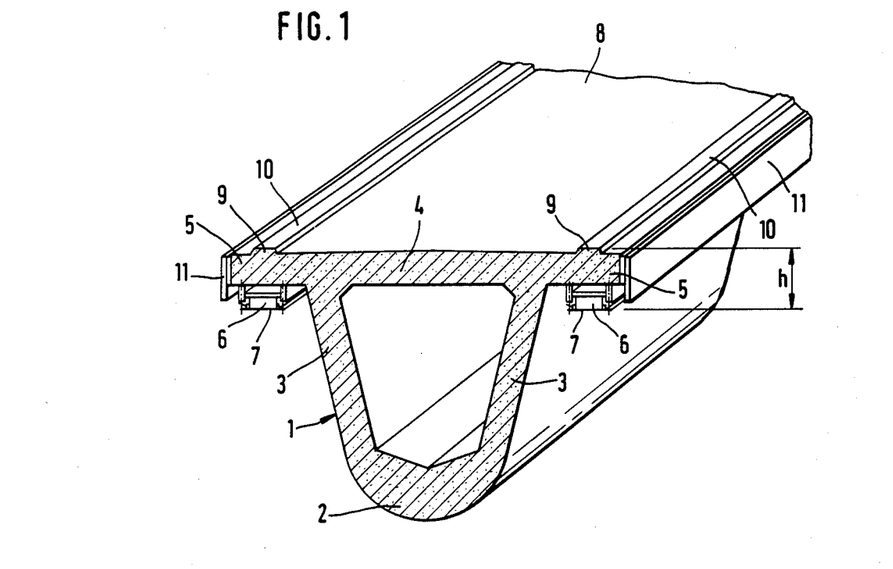
FIG. 1 is a perspective view, partly in cross-section, of a track support beam made of prestressed concrete with operating elements or surfaces attached to the beam.

The location and relation of the operating element and the operating surfaces of an electromagnetically levitated vehicle, how shown, is displayed in FIG. 1, where the track for the levitated vehicle is formed by a track support beam 1, constructed of reinforced or prestressed concrete. Track support beam 1 is a hollow grinder-like beam with a closed approximately trapezoidally-shaped cross-section. The beam 1 has a lower base section 2 rounded at its lower surface with an upper cover plate supported on webs 3, extending upwardly from the base section and diverging outwardly from one another toward the cover plate. The cover plate 4 is cantilevered on both sides laterally outwardly from the longitudinal extending webs 3 forming a cantilevered part on each side of the top of the beam 1. On the cantilevered parts of the cover plate, the operating elements for the track are positioned and the elements from operating surfaces.

The operating surfaces include first the lower or downwardly facing surface 7 of the support stator 6, each arranged on the lower side of one of the cantilevered parts 5. The lower surface 7 has a vertical spacing h below the slide surface 10 of the slide rails 9, located on the upper surface 8 of the beam 1. The operating surfaces also include side guidance rails 11, each provided along a different one of the longitudinal extending outer sides of the cantilevered parts 5.

The manner in which the support stators 6, including the stator windings and the side guidance rails 11, are secured to the concrete structure of the track support beam 1, is not part of the present invention. It is possible to provide the stators and the side guidance rails with anchor bolts, which subsequently are introduced into recesses formed in the concrete structure and are sealed by pouring a hardenable material into the recesses. It is also possible, however, to provide connecting members at the connecting location when the track carrier beam 1 is being constructed and, subsequently, bores are provided in the connecting member for attaching the operating element while maintaining accurate positioning of the elements.

Figure 1A:
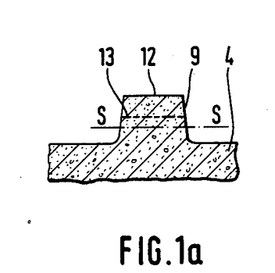
FIGS. 1a–1c are partial cross-sectional views of the track support beam illustrating the working steps in the formation of the slide surfaces on a slide rail in accordance with the present invention and displayed on a larger scale as compared to FIG. 1.
Figure 1B:
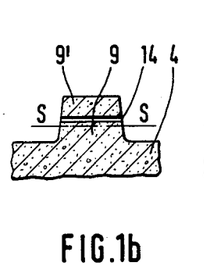
Figure 1C:
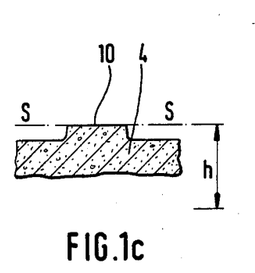

The method of the present invention can be explained with the aid of FIGS. 1a to 1c, showing an enlarged detail from an upper part of the cover plate 4 of the track support beam 1 with each Figure showing a different form of the slide rail 9, during the performance of the method. In FIG. 1a, the slide rail 9 is initially formed with a height oversize extending upwardly above the plane S—S containing the slide surface 10. As a result, the initial upper surface 12 of the slide rail 9, can be left in a roughened condition, when the beam is poured, and it is acceptable if the upper region of the slide rail 9 is not carefully compacted when it is poured.

To remove the oversize height part of the slide rail 9, initially a cut 14, note FIG. 1b, is made in the plane 13 shown in dashed lines in FIG. 1a, slightly above the plane S—S. Due to the cut through the height oversize part, a strip-like section 9' of the slide rail 9 is removed. This cutting step provides a rough approximation of the final slide surface 10. The cut portion 9' is removed and preferably is broken up into small briquette-like pieces.

In a further working operation on the slide rail, the residual portion of the height oversize part between the cut 14 and the plane S—S is removed by grinding and finally the slide surface 10 of the slide rail 9 is polished or finished until the desired finish of the slide surface 10, required for the operation of the electromagnetic railway, is achieved, note FIG. 1c. After the finishing of the slide surface 10, the distance between the slide surface and the lower surface 7 of the stator is exactly the dimension h.

Figure 2:
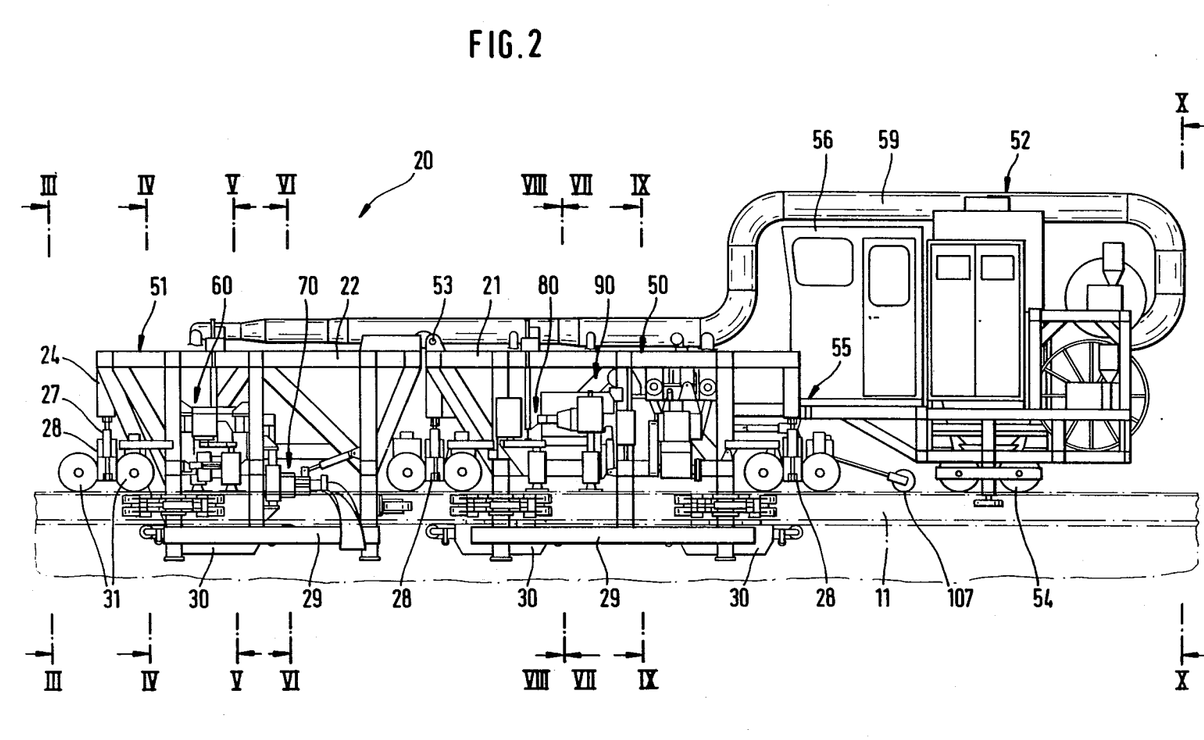
FIG. 2 is a schematic side view of a machine frame mounting the working devices making up the present invention.
Figure 3:
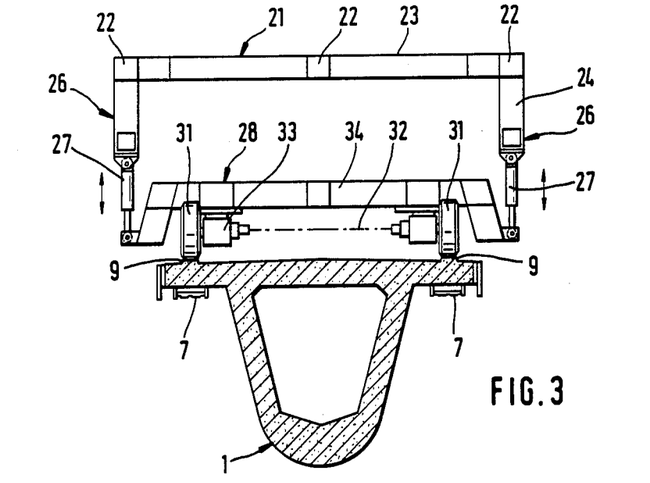
FIG. 3 is a cross-sectional view of a track support beam with the machine frame mounted on the beam and the section being taken along the line III—III in FIG. 2.
Figure 4:
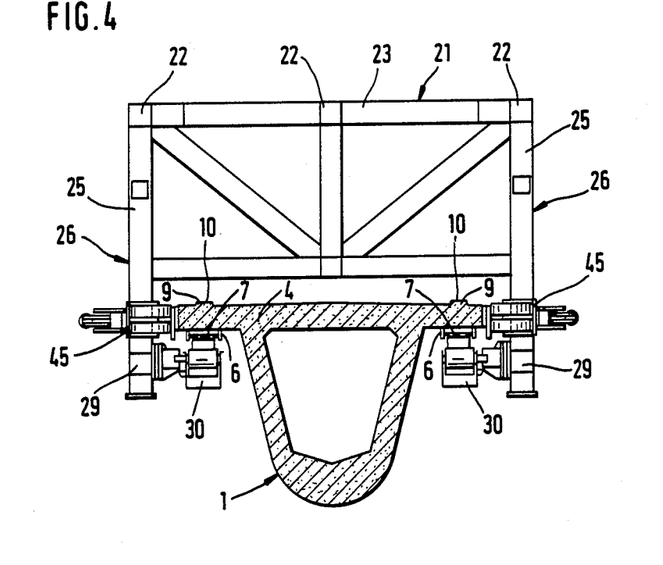
FIG. 4 is another cross-sectional view of the track support beam with the machine frame mounted on it with the section taken along the line IV—IV in FIG. 2.

The apparatus used in accordance with the present invention for the removal of the height oversize part of the slide rails based as a function of the dimension above the lower surface 7 of the support stator 6, is effected with the devices illustrated in FIG. 2 in a schematic side view. In FIGS. 3 and 4, the support of the travelling device for the working device on the track support beam is shown in cross-section and in FIGS. 5 to 9, the position and arrangement of the individual working devices is set forth in cross-sections shown through the track support beams and in a travelling support 20.

The travelling support 20, in accordance with the present invention and as viewed in FIG. 2, comprises a machine frame 21, formed as a truss-like structure and including longitudinal beams 22, extending in the travel direction, lateral beams 23, extending transversely of the travel direction and vertical supports 24, 25 located along the sides of the machine frame 21. These various beams form the truss-like walls 26 by incorporating stiffening members. The truss-like walls 26 are located outwardly from the sides of the track support beam 1, note FIGS. 3 and 4. The machine frame 21 is supported on rolling members 28, note FIG. 3, so that the frame is adjustable in height through the relative short vertical supports 24 and the hydraulically actuatable piston-cylinder units 27. The longer vertical supports 25 extending downwardly below the cover plate 4 of the track support beam 1 are stiffened at the lower ends by longitudinal beams 29. Probing devices 30 mounted on the longitudinal beams contact, from below, the lower surface 7 of the support stators 6, note FIG. 4. Vertical supports 25 extend downwardly below the probing devices 30 and form support pedestals for supporting the frame without any additional means on a support floor transporting device.

The rolling members 28 are made up of sets of wheels each comprising two wheels 31, with the set supported at the lower end of the piston-cylinder units 27, note FIGS. 2 and 3. The wheels 31, spaced apart in the longitudinal direction of the machine frame 21, are supported on the slide rails 9.

Figures 11, 12:
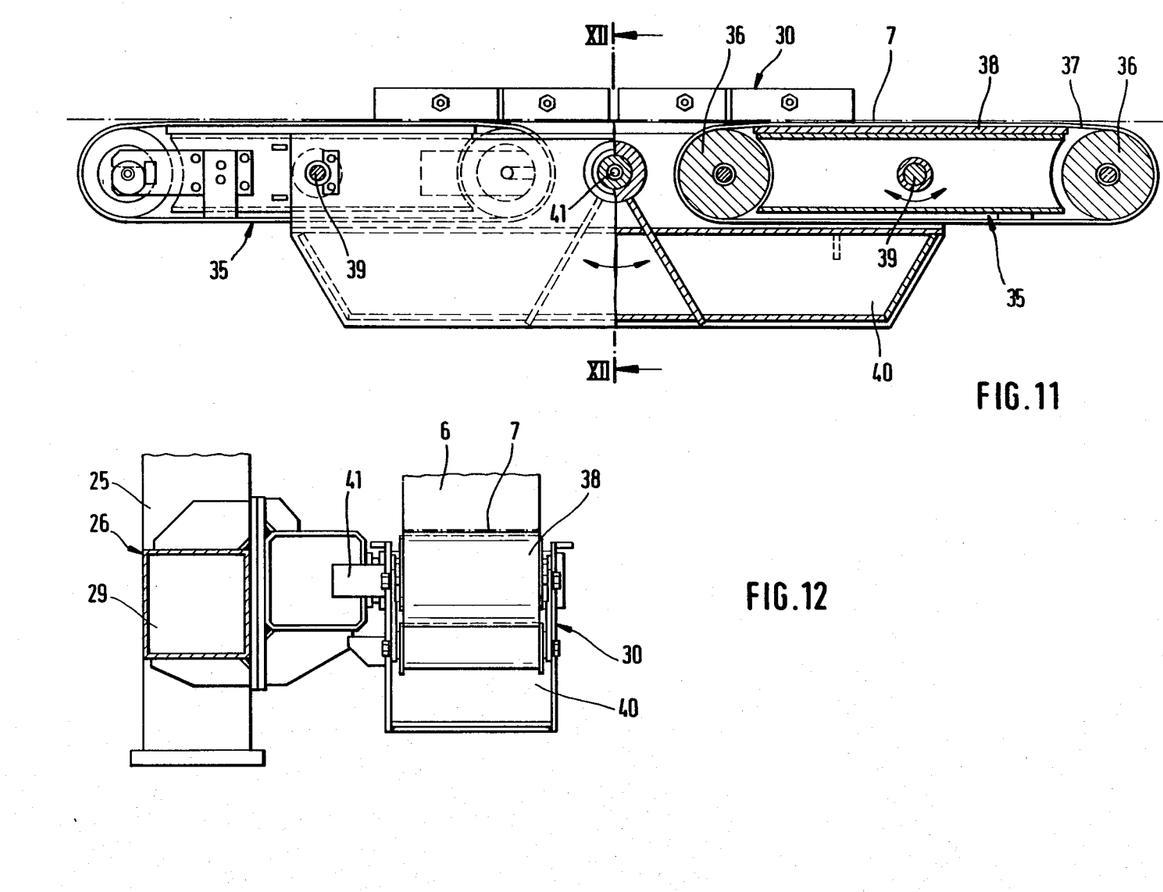
FIG. 11 is an elevational view, partly in cross-section, of a belt rolling device shown on an enlarged scale.
FIG. 12 is a cross-sectional view taken along the line XII—XII in FIG. 11.

Probing devices 30 are depicted in FIGS. 11 and 12 on an enlarged scale and are made up of two belt-type rolling mechanisms 35, each having a belt 37 formed of leather, plastics or the like trained around rollers 36 with a steel load distribution plate 38, located within each belt at the upper run between the rollers. The upper run of the belt 37 is located between the plate 38 and the lower surfaces 7 of the support stators. The belt 37 rolls on the lower surface 7, shown in broken lines in FIG. 11.

Each of the belt-type rolling mechanisms 35 is supported at a rocker 40 so that it pivots about an axis 39. In turn, the rocker is fastened to the machine frame 21 so that it can be pivoted around an axis 41.

Side guidance rollers 45 provide side guidance for the machine frame 21 and the rollers are arranged as twin rollers, that is, in pairs, in the region of the taller vertical supports 25, note FIG. 4, and the probing devices 30 are located in the same region, note FIG. 2. Side guidance rollers 45 roll on the side guidance rails 11 and they are pressed against the rails by hydraulic presses. The placement of the side guidance rollers 45 occurs against adjustable stops with a slight side play. This arrangement assures accurate side guidance of the machine frame 21.

This type of bearing arrangement permits the machine frame 21, which carries the working devices, to be explained later, to be movable along a track support beam 1 in the longitudinal direction and to permit it to be in contact with the lower surface 7 of the support stators 6 for adjustment purposes by a lifting movement provided by the piston-cylinder units 27. Due to the counter bearing against the roller surface 7 of the support stators 6, which counter bearing are formed as belt-type rolling mechanisms 35, continuous movement of the machine frame without permanent retention of a frictional lock with the lower surface 7 is possible.

To provide reliable adjustment of the machine frame 21 relative to the support stators 6, without overstressing them, load measuring devices are provided in the region of the probing devices 30, and based on the measuring result of such devices, it is possible to adjust the piston-cylinder units 27 for the support of the machine frame 21 relative to the upper rolling members 28. Accordingly, it is possible to guide the machine frame 21 and the different working devices, continuously in a self-propelled manner with a selectable and controllable speed over the track support beam, whereby the necessary working operation for forming the slide surfaces 10 can be carried out in a single working operation while assuring the required roughness or surface condition of the slide surfaces 10.

In addition to this arrangement of the machine frame for supporting it on a track support beam, the machine frame, as shown in FIG. 2, is made up of three parts, that is, a centrally positioned base frame independently displaceable by two rolling members 28, a front attachment frame 51, located on the left end of the central base frame, and a trailer 52 located on the right end of the base frame. The front attachment frame 51 has only one set of rolling members 28 and it abuts at one end through a joint 53 against the adjacent end of the base frame 50. Further, the trailer 52 has only one set of wheels 54, which are not driven, and it abuts the base frame 50 at its end 55, so that the end 55 is located above the set of wheel members 28 at the adjacent end of the base frame in the manner of a semi-trailer.

Figure 5:
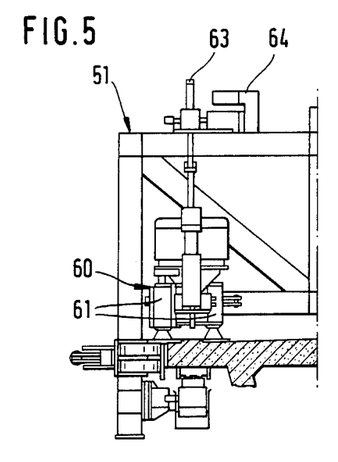
FIG. 5 is another view similar to FIGS. 3 and 4, showing only an upper portion of the support beam with the section being taken along the line V—V in FIG. 2, and displayed a part of the cutting device.
Figure 6:
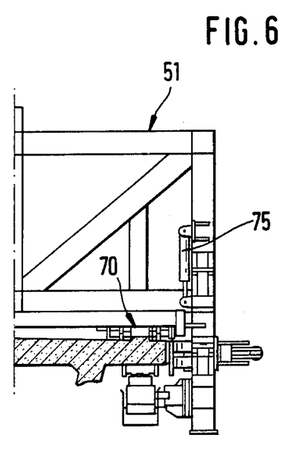
FIG. 6 is a partial cross-sectional view similar to FIG. 5, taken along the line VI—VI in FIG. 2 and illustrating the crushing or breaking device.
Figure 7:
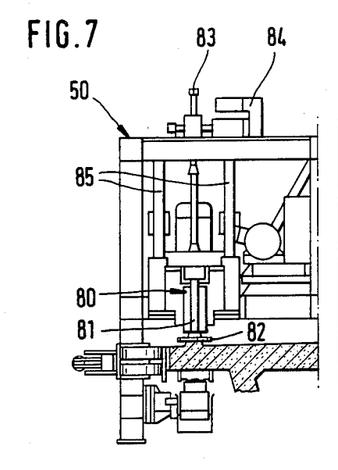
FIG. 7 is another partial cross-sectional view similar to FIG. 5, and taken along the line of VII—VII in FIG. 3, and showing a grinding device.
Figure 13:
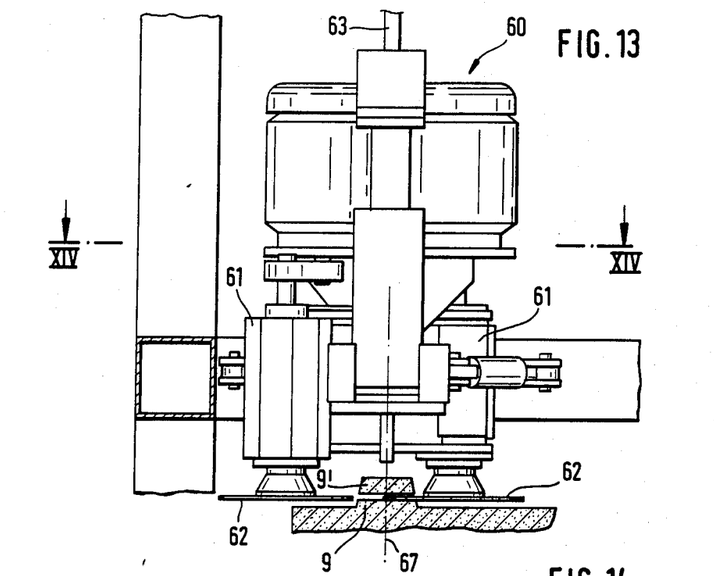
FIG. 13 is an elevational view of a cutting device on an enlarged scale with respect to FIG. 5.
Figure 14:
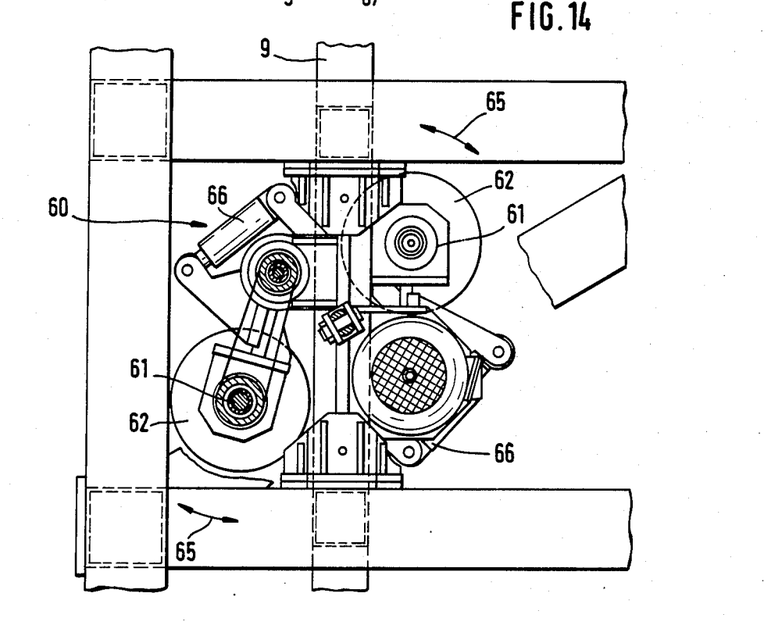
FIG. 14 is a horizontal cross-sectional view taken along the line XIV—XIV in FIG. 15.
Figures 15, 16:
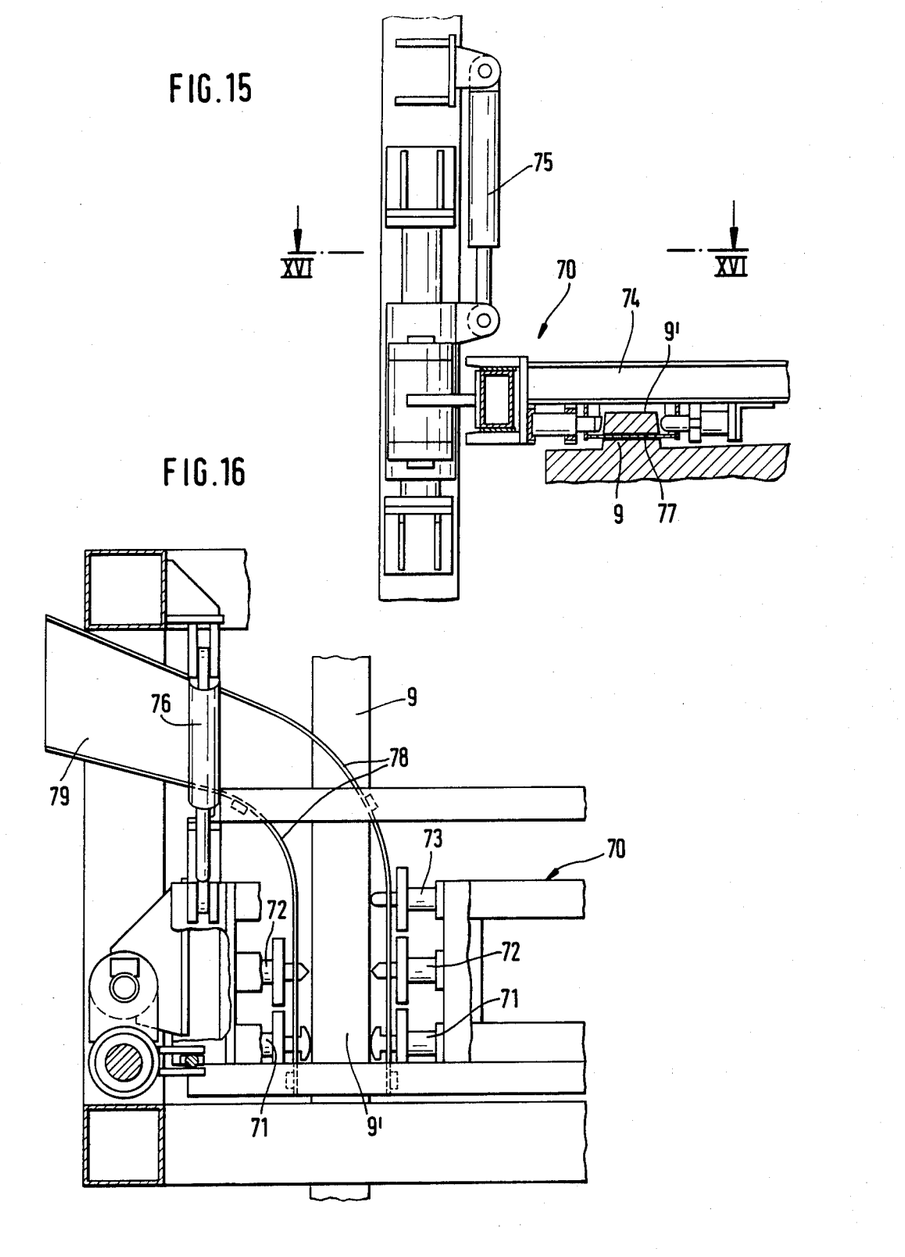
FIG. 15 is an enlarged showing of the crushing device displayed in FIG. 6.
FIG. 16 is a plan view, partly in section, taken along the line XVI—XVI in FIG. 15.

Two cutting devices 60, note FIG. 5, 13 and 14, and two breaking or crushing devices 70, note FIG. 6, 15 and 16, are located on the front attachment frame 51 symmetrical relative to the longitudinal central axis of the machine frame 21. Two grinding devices 80, note FIG. 7, are located on the central base frame 50, along with two finishing or polishing devices 90, note FIG. 8, and two transverse milling devices 100, note FIG. 9. These various devices follow one another in the longitudinal direction of the machine frame 21 for carrying out the required working operations on the slide rails 9.

The division of the machine frame into a central base frame 50, and a front attachment frame 51, is due to the fact that the cutting devices 60 and the breaking devices 70, located on the front attachment frame 51, are required only if the slide surfaces 10 are to be formed on a newly constructed track support beam 1. It is possible to eliminate the front attachment frame 21, if only maintenance and reworking is required on a track support beam having the necessary slide surfaces. For such maintenance and reworking, the grinding devices 80, the finishing devices 90, and the milling devices 100 are sufficient. Control units for the different working devices and the power drive of the devices are housed in the trailer 52, as well as the means for supplying electric current, compressed air, water and the like, and for the removal of the waste products generated.

Each cutting device 60, note FIGS. 5, 13 and 14, includes two cutting members 61, each with one cutter disk 62, combing to form one cutting device. The entire cutting device 60 is adjustable in height by a spindle 63 and an actuation motor 64 and the height adjustment is effected against a displaceable stop. The cutting members 61 with the cutter disks 62 are driven by belt drives and can be pivoted in the direction of the arrow 65 in FIG. 14. Cylinders 66 are afforded for effecting the pivoting action of the cutting members. Accordingly, the cutting devices can be moved into and out of the cutting position relative to the slide rail 9 to be cut. The two cutting members 61 are offset relative to one another in the long direction of the machine frame 21 with respect to the slide rail 9 and are located on both sides of the slide rail so that each cutting disk 62 can cut laterally into the slide rail 9 to a point past the longitudinal central axis 67, see FIG. 13.

The upper part 9' of the slide rail 9, cut off by the cutter disk 62 must be removed so that the following grinding devices 80 can work on the cut surface of the slide rail. The removal of the upper part 9' is effected by a breaking device 70, shown in FIG. 6, and illustrated on a larger scale in FIGS. 15 and 16. Each breaking device 70 includes two clamping cylinders 71 acting against one another for clamping the cut upper part 9' of the slide rail 9. In addition, there are two bracing cylinders 72 located on the opposite sides of the slide rail 9, and one breaking cylinder 73. As can be seen in FIG. 16, the different cylinders follow one after the other in the long direction of the machine frame. Cylinders 71, 72 and 73 are supported on a cross-tie 74, which is retained in the machine frame so that it is adjustable in height and can be displaced in the long direction of the frame. Height adjustment is provided by piston-cylinder unit 75 located on the side wall of the machine frame 21. The movement of the breaking device 70 in the long direction is required so that it does not interfere with the continuous feed of the machine frame during the breaking operation, since for such operation a temporary clamping of the slide rail 9 is required. Cylinders 76 positioned between the machine frame 21 and the breaker unit devices 70, assure the required follow-up movement of the breaking devices.

In breaking up the cut-off part 9' of the slide rail 9, initially a clamping cylinder 71 and then the bracing cylinders 72 are extended into contact with the sides of the rail. At least, the bracing cylinder located opposite the breaking cylinder 73 must be locked in position so that high pressures can be applied by the breaking cylinder. Accordingly, handy briquette-shaped portions of the cut-off part of the guide rail can be produced by the breaking cylinder 73 in the cross-sectional plane of the slide rail 9 determined by the bracing cylinder 72.

The breaking device 70 is closely spaced from the cutter device 60. To prevent interference with the cutting disks 62, caused by bending of the cut-off part 9' of the slide rail 9, the breaking device 70 includes a separation plate 77 acting as a spacer and the plate is approximately the same thickness as the cutter disks 62 of the cutting device 60 and the gap formed by the cutting disk between the lower slide rail 9 and its upper cut-off part 9'. The spacer plate forms a surface on which the cut-off part 9' slides and also acts as a chute 79 with side guides 78 for ejecting the cut-off pieces in the lateral direction.

Figure 8:
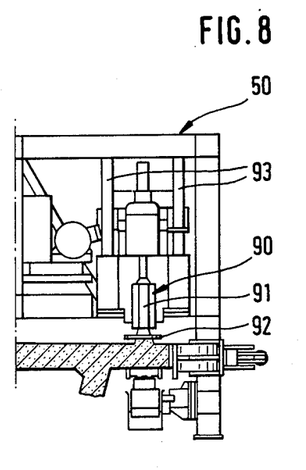
FIG. 8 is another partial cross-sectional view similar to FIG. 6, and taken along the line VIII—VIII in FIG. 2 with a finishing or polishing device mounted on the machine frame.
Figure 9:
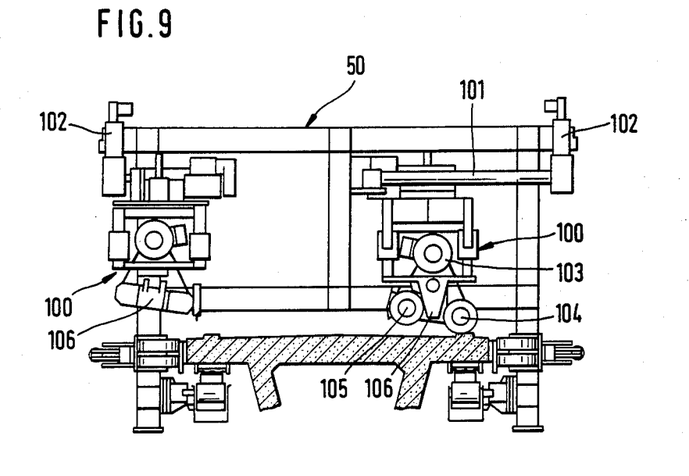
FIG. 9 is a cross-sectional view taken along the line IX—IX in FIG. 2, displayed a transverse milling device mounted on the machine frame and with only the upper portion of the track support beam shown.

One grinding device 80 and one finishing or polishing device 90 is located symmetrically on each of the opposite sides of the longitudinal central axis of the base frame 50 of the machine frame 21, and they are shown in the cross-sectional views of FIGS. 7 and 8 which represent only one-half of the cross-section of the machine frame.

Grinding device 80 has a grinding member 81 with one grinding disk 82. The entire grinding device 80 is supported on the machine frame 21 so as to be displaceable in height, that is, in the vertical direction, via a spindle 83 and an actuating motor 84 and to be adjustable against a stop. Two vertical guide rods 85 serve as parallel guides during height adjustment for guiding the grinding device 80. Means for supplying water to the surface to be ground and also for removing any residues are provided in the usual manner on the grinding device.

Finishing or polishing devices 90 are located downstream or following the grinding devices and are made up of a finishing member 91 with a vertical axis of rotation and a finishing or polishing disk 92. The finishing device 90 is adjustable in height along the vertical guide rods 93 similar to the arrangement of the grinding device 80. The finishing device, however, is suspended so as to be counter-balanced and operate in a floating manner with an adjustable slight contact load. The finishing unit provides a fine-finishing of the upper surface of the slide rail 9 to produce the required degree of roughness on the slide surface 10.

Since the finished slide rails 9 on the upper surface of the track support beam 1 would interfere with the drainage of surface water in the lateral direction of the track, it is necessary to interrupt the slide rails at specific distances by transverse slots. Further, the edges of the slide rails must be rounded off at the ends of the track support beam 1 and at the transverse slots, so that any possible height differences within the tolerance range between adjacent track support beams can be accommodated. To provide the desired rounding off action, transverse milling devices 100 are provided at the downstream end of the central base frame, note FIG. 9. Each of the milling devices 100 is supported so that it can be moved in the transverse direction of the machine frame. For this purpose, a horizontal spindle 101 and an actuating motor 102 are provided. Further, each transverse milling device 100 is adjustable in height and is supportable in the long direction of the machine frame 21 so that a fine adjustment of the rounding-off action at the transversely extending edges of the slide rails 9 can be effected. Each milling device 100 has two milling cutter disks 104, 105 with a drive motor and the milling cutter disks are supported at a rocker 106 and can be applied in turn to the slide rails 9. One of the milling cutter disks is used for cutting the transverse slots and the other for rounding-off the edges at the ends of the track support beams and at the transverse slots.

While the other working devices operate during the forward movement of the machine frame 21 along the track support beam 1, the transverse milling devices 100 operate during the return travel otherwise the transverse slots just produced would interfere with the rolling movement of the wheels 31 on the slide surfaces 10 of the slide rails 9. A length measurement wheel 107, note FIG. 2, rolls during the forward and reverse return motion of the machine frame along with the slide rails and provides the pulses for the production of the transverse slots.

Figure 10:
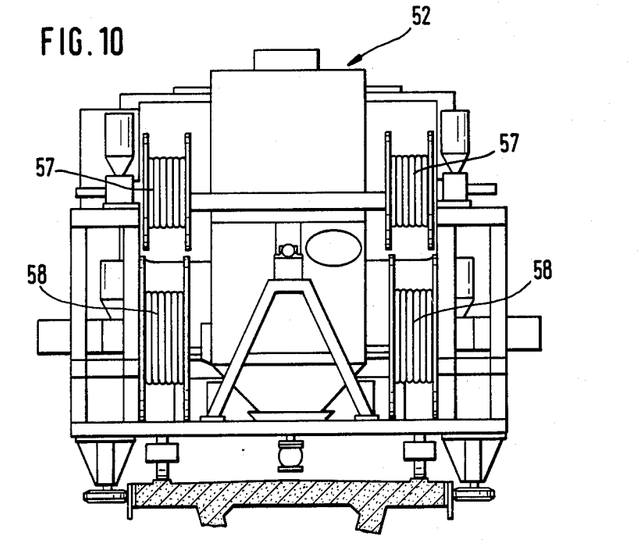
FIG. 10 is a cross-sectional view similar to FIG. 9, exhibiting a rear view of the machine frame taken along the line X—X in FIG. 2, and illustrating the trailer.

Trailer 52 follows the machine frame 21 and is not driven. The trailer, in addition to a cabin 56 with a control stand, has cable drums and hose reels 57, 58 for supply to and waste removal from the working devices. In addition, a pipe-line 59 is provided for the removal of waste, such as dust and water at the individual working stations.

The apparatus 20 of the present invention is primarily intended for working on the slide rails 9 to form the slide surfaces 10 as a part of the operational surfaces of a new track support beam. These working operations are carried out after the track support beam is constructed and the operational elements are installed and prior to the placement of the track support beam in its final position in the track on elevated piers. It is also possible, however, to utilize the apparatus 20 in the same manner for working or reworking the slide surfaces of the track support beams already located in its final position. If such a reworking operation is to be carried out, only the front attachment frame 51 needs to be removed, since the slide surfaces 10 are already located at the desired height. In addition, the machine frame 21 is provided with work platforms attached along its sides.

A facility in which a track support beam can be put worked utilizing the apparatus of the present invention is disclosed in FIGS. 17 to 20.

Figure 17:
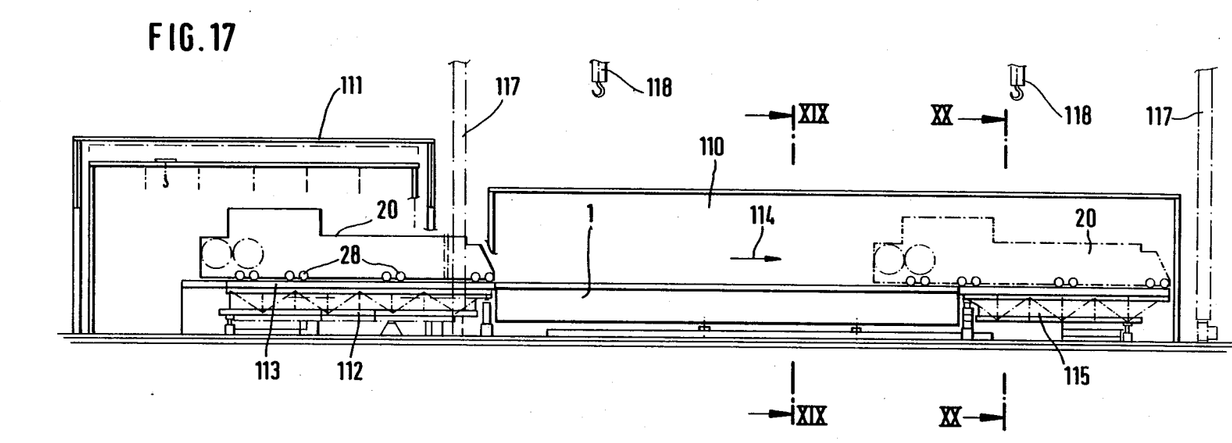
FIG. 17 is an elevational view through a facility for carrying out the working operation of a track support beam illustrating different positions of the machine frame.
Figure 18:
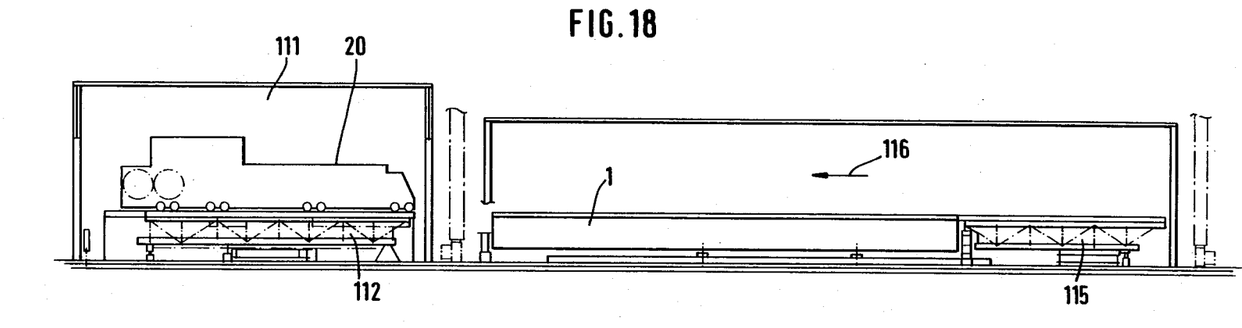
FIG. 18 is a view similar to FIG. 17 displaying the machine frame in a stationary or parked position.
Figure 19:
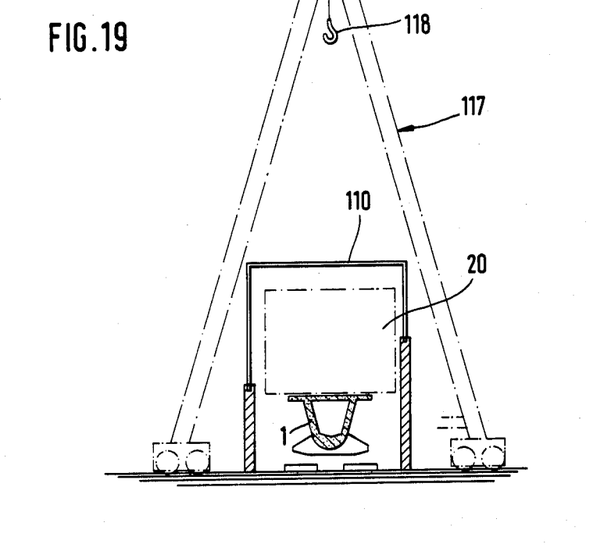
FIG. 19 is a cross-sectional view taken along the line XIX—XIX in FIG. 17.
Figure 20:
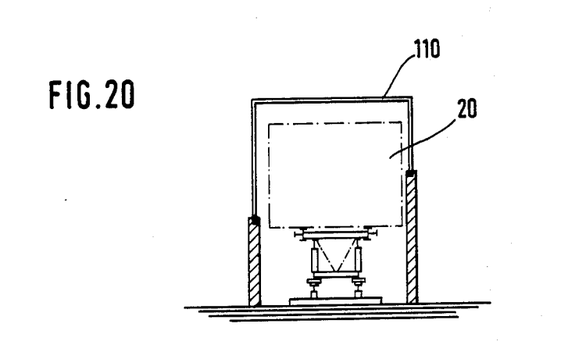
FIG 20 is a cross-sectional view taken along the line XX—XX in FIG. 17.

FIG. 17 contains a longitudinal section of the facility for carrying out the working operations on the track support beam. A track support beam 1 rests on appropriate supports in a concreting space. The apparatus 20 is positioned on a parking support beam 112 located in an adjacent workshop space 111. The parking beam 112 has travel rails 113 for the rolling members 28 of the apparatus 20, and at its underside has planes forming a continuation of the lower surfaces of the support stators 6 on the track support beam to be worked so that the working devices can be set at the correct height 11 from the outset.

In the position illustrated in FIG. 17, the arrangement of the parking beam 112 permits the apparatus to move out of the workshop space 111 and commence the working of the slide rails 9 on the track support beam 1 in the concreting space 110. The working operation of the apparatus 20 takes place in the direction of the arrow 114, that is, as viewed in FIG. 17 from left to right. After completion of the first working phase, including cutting, breaking, grinding and finishing the slide rails, the apparatus 20 has moved to the position above the reference beam 115 at the right-hand side in FIG. 17. The reference beam 115 provides a continuation of the travel path on the track support beam 1 so that the last working devices move past the end of the track support beam 1. The apparatus then performs a second work phase in which the transverse slots and the rounding-off of the edges is effected with the travel of the apparatus 20 in the opposite direction, that is in the direction of the arrow 116 in FIG. 18 until the apparatus has traversed the track support beam 1 and returned to the position on the parking beam 112 shown in FIG. 18

The parking beam 112 is supported so that it can be moved in its long direction at its lower surface whereby the apparatus 20 positioned on the parking beam can be separated from the track support beam 1 and rolled completely into the working space 111. Reference beam 115 is also supported so that it can be displaced in its longitudinal direction so that it can be moved to accommodate different lengths of the track support beam 1.

A gantry crane 117 with a crane hook 118 spans the concreting space 110, note FIG. 17 so that the crane can pick up the track support beam 1 and move it as required.

While specific embodiments of the invention have been shown and described in detail to illustrate the application of the inventive principles, it will be understood that the invention may be embodied otherwise without departing from such principles.

We claim:

1. Method of accurately positioning slide surfaces on slide rails on a track for electromagnetically levitated vehicles where the track is formed as a beam from at least one of steel, reinforced concrete and prestressed concrete, the track including the beam elongated in the direction of the track and including an upper part having an upper surface and a base extending downwardly from the upper part with the upper part cantilevered laterally outwardly from the base and forming cantilevered parts with slide rails located on and extending upwardly from the upper surface of the cantilevered parts, support stators located on the underside of the cantilevered parts below the slide rails and the support stators having a lower surface, the support stators arranged to be engaged by the levitated vehicles, wherein the method comprises the steps of providing the slide rails oversized in height upwardly from the upper surface of said cantilevered parts, attaching and adjusting the support stators on the undersides of the cantilevered parts, forming the slide surfaces on the upper surface of said slide rails by removing the height oversize and guiding the formation of the slide surfaces using the lower surface of the support stators as a reference plane.

2. Method, as set forth in claim 1, including steps of arranging guidance rails on the longitudinal extending sides of the cantilevered parts located outwardly from the base for providing operational surfaces for the levitated vehicles, and forming the slide surfaces after adjusting and attaching the side guidance rails.

3. Method, as set forth in claim 2, wherein forming the slide rails of one of reinforced and prestressed concrete, and cutting each slide rail for removing the height oversize initially by cutting a portion of the height oversize in a plane parallel to the underside of the support stator for establishing a coarse adjustment of the plane of the slide surfaces above the upper surface of the upper part, grinding the cut surface of the slide rail for effecting a fine adjustment of the plane of the slide surfaces, and finishing the ground sliding surface of the slide rail for producing the required degree of roughness.

4. Method, as set forth in claim 3, wherein after finishing the slide surfaces forming transversely extending slots in said slide rails for water drainage of the upper surface of said track.

5. Method, as set forth in claim 4, wherein milling the slot in the slide rails.

6. Method, as set forth in claim 6, wherein, after completing the slots, milling transversely extending edges on the slide rails and in the slots for effecting a rounding-off of the transversely extending edges.

7. Method, as set forth in claim 1, wherein forming the slide rails of one of reinforced and prestressed concrete, and cutting each slide rail for removing the height oversize initially by cutting a portion of the height oversize in a plane parallel to the underside of the support stator for establishing a coarse adjustment of the plane of the slide surfaces above the upper surface of the upper part, grinding the cut surface of the slide rail for effecting a fine adjustment of the plane of the slide surfaces, and finishing the ground sliding surface of the slide rail for producing the required degree of roughness.

8. Method, as set forth in claim 7, wherein after finishing the slide surfaces forming transversely extending slots in said slide rails for water drainage of the upper surface of said track.

9. Method, as set forth in claim 8, wherein milling the slot in the slide rails.

10. Method, as set forth in claim 9, wherein, after completing the slots, milling transversely extending edges on the slide rails and in the slots for effecting a rounding-off of the transversely extending edges.

* * * * *